United States Patent
Haist

(10) Patent No.: US 11,512,784 B2
(45) Date of Patent: Nov. 29, 2022

(54) CONTROL VALVE HAVING A RADIAL RECESS IN THE REGION OF THE FIRST AND THE SECOND ORIFICE

(71) Applicant: Robert Bosch GmbH, Stuttgart (DE)

(72) Inventor: Andreas Haist, Freudenstadt-Dietersweiler (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/317,446

(22) Filed: May 11, 2021

(65) Prior Publication Data

US 2022/0018454 A1 Jan. 20, 2022

(30) Foreign Application Priority Data

Jul. 16, 2020 (DE) ...................... 10 2020 208 933.7

(51) Int. Cl.
*F16K 11/07* (2006.01)
(52) U.S. Cl.
CPC ................... *F16K 11/07* (2013.01)
(58) Field of Classification Search
CPC ............................ F16K 11/07; F16K 11/0712
USPC ........................ 137/625.27, 625.67, 625.69
See application file for complete search history.

(56) References Cited

U.S. PATENT DOCUMENTS

| | | | | | |
|---|---|---|---|---|---|
| 3,049,147 A | * | 8/1962 | Neilson | ................ | F15B 13/04 137/625.69 |
| 3,951,166 A | * | 4/1976 | Whitener | ........... | F16K 11/0712 137/625.27 |
| 4,217,934 A | * | 8/1980 | Peters | ................ | F16K 17/02 137/625.66 |
| 5,263,513 A | * | 11/1993 | Roe | ................ | F15B 13/0405 137/596.15 |
| 6,050,081 A | * | 4/2000 | Jansen | ................ | F02C 7/232 137/112 |

FOREIGN PATENT DOCUMENTS

DE 42 24 469 A1 1/1994
EP 1 409 873 B1 4/2009

OTHER PUBLICATIONS

Original and Translation of FR 1376217 A; Amot Controls Corp; Oct. 23, 1964.*

* cited by examiner

*Primary Examiner* — Paul J Gray
(74) *Attorney, Agent, or Firm* — Maginot, Moore & Beck LLP

(57) ABSTRACT

A control valve has a housing, which has a first bore in which a control spool is accommodated in such a way as to be movable along a longitudinal axis. The control spool defines first and second orifices which are adjustable. First and second reference planes are each oriented perpendicularly to the longitudinal axis, wherein the first reference plane is defined by a first control edge, more specifically in the position of the control spool in which the first orifice is just closed, wherein the second reference plane is defined by a second control edge, more specifically in the position of the control spool in which the second orifice is just closed. At least one radial recess different from the second bore is provided in the first bore between the first and the second reference plane in the direction of the longitudinal axis.

15 Claims, 2 Drawing Sheets

CONTROL VALVE HAVING A RADIAL RECESS IN THE REGION OF THE FIRST AND THE SECOND ORIFICE

This application claims priority under 35 U.S.C. § 119 to application no. DE 10 2020 208 933.7, filed on Jul. 16, 2020 in Germany, the disclosure of which is incorporated herein by reference in its entirety.

The disclosure relates to a control valve and to an assembly having a control valve of this kind.

BACKGROUND

EP 1 409 873 B1 discloses a control valve by means of which a hydraulic machine is controlled. The hydraulic machine, which is embodied as an axial piston machine of bent-axis construction for example, has a single-acting actuating cylinder, by means of which the displacement volume of the hydraulic machine can be adjusted. The control valve has a first and a second orifice, which can be adjusted in opposite senses by means of a control spool, wherein said orifices are connected to the actuating cylinder. In this arrangement, the control spool is accommodated relative to a longitudinal axis in a first bore of the housing. It has a first and a second control edge, which each extend in the form of a circular ring around the longitudinal axis, wherein the first and the second control edge are spaced apart from one another in the direction of the longitudinal axis. The first and the second control edge interact with a second bore, which traverses the first bore transversely to the longitudinal axis, in order to form the first and the second orifice. This very simple and low-cost configuration of a spool valve is used on both control spools of the known control valve, wherein the present disclosure can be used in both cases.

The disadvantage of the low-cost configuration explained above is that the opening behavior of the first and of the second orifice cannot be influenced by means of the fine control notches on the control spool which are known, for example, from DE 42 24 469 A1. First of all, there is not enough space for this purpose. Moreover, the rotational position of the control spool relative to the longitudinal axis would have to be fixed in order for a defined opening behavior to be ensured with the above non-rotationally symmetrical configuration. This would have a disadvantageous effect on the reliability of the control valve.

SUMMARY

One advantage of the valve according to the disclosure is that the opening behavior of the first and of the second orifice can be finely adjusted with little effort. Despite the configuration of the first and of the second orifice in a manner which is not rotationally symmetrical overall, there is furthermore no need to secure the control spool against rotation.

The proposal according to the disclosure is that a first and a second reference plane are each oriented perpendicularly to the longitudinal axis, wherein the first reference plane is defined by the first control edge, more specifically in the position of the control spool in which the first orifice is just closed, wherein the second reference plane is defined by the second control edge, more specifically in the position of the control spool in which the second orifice is just closed, wherein at least one radial recess different from the second bore is provided in the first bore between the first and the second reference plane in the direction of the longitudinal axis.

It is preferred that neither the first nor the second reference plane touch or intersect said radial recess. A single radial recess is preferably provided. The first and the second control edge are preferably of circular ring-shaped design relative to the longitudinal axis, wherein they are most preferably contained fully within the first and the second reference plane, respectively. The second bore is preferably embodied as a circular cylinder. The second bore is preferably embodied as a blind hole which traverses the first bore. The control spool is preferably embodied in such a way as to be rotationally symmetrical relative to the longitudinal axis, at least in the region of the first and the second control edge. The first and the second orifice preferably have a negative overlap. That is to say there is a small adjustment range of the control spool in which both the first and the second orifice are open to the minimum extent. The radial recess according to the disclosure is preferably substantially ineffective in said adjustment range.

The radial recess according to the disclosure preferably comes into effect when either the first or the second orifice is completely closed.

Provision can be made for the volume with which the radial recess protrudes beyond the circular cylinder defined by the first bore to be chosen to be so small that said volume brings about a reduction in the flow resistance of the first and of the second orifice which does not exceed 50% of the corresponding flow resistance without the radial recess in any position of the control spool, said reduction being dependent on the position of the control spool. This results in a particularly compact control valve. The radial recess can be integrated without problems in existing control valves.

Provision can be made for the radial recess to be formed by a third bore in the housing which extends transversely to the longitudinal axis, wherein the diameter of the third bore is smaller than the diameter of the second bore. This embodiment is particularly simple to produce. The third bore is preferably embodied as a circular cylinder. The third bore is preferably embodied as a blind hole, the open end of which is most preferably closed by means of a plug. The second and the third bore are arranged offset relative to one another, preferably by 90°, in respect of a rotation around the longitudinal axis.

Provision can be made for the radial recess to be formed by a groove in the housing, which groove extends in the form of a circular ring with a constant cross-sectional shape around the longitudinal axis. It is conceivable for both the groove and the third bore to be provided as radial recesses. There is a largely free choice of cross-sectional shape for the groove, and, as a result, the opening behavior of the first and the second orifice can be set in a flexible manner. Moreover, the groove requires little installation space.

Provision can be made for the stated cross-sectional shape to have a first and a second sloping portion, which slope in opposite directions relative to the longitudinal axis, wherein they are arranged adjacent to one another in a region of maximum depth of the groove. The flow within the groove can be influenced in an effective manner by means of the slope of the first and the second sloping portion. Consequently, the slope also influences the opening behavior of the first and the second orifice. The first and/or the second sloping portion preferably end/ends at the first bore. The corresponding transition can be embodied with sharp edges, other transitions being explained below.

Provision can be made for the first and/or the second sloping portion to be of straight design. Thus, they are particularly simple to produce.

Provision can be made for a slope of the first and/or the second sloping portion relative to the longitudinal axis to be between 5° and 45°. Tests by the applicant have shown that the control behavior with this configuration is particularly favorable. The stated slope is 38°, for example.

Provision can be made for a transition between the first and/or the second sloping portion and the first bore to be of rounded or beveled design. Kinks in the opening behavior of the first and/or the second orifice are thereby avoided.

Provision can be made for the control spool to have a third neck portion, which has a reduced diameter in comparison with the first bore, wherein the third neck portion is arranged between the first and the second control edge. Particularly in combination with the first and the second sloping portion, it is thereby possible to balance out flow forces acting on the control spool in the direction of the longitudinal axis. Such flow forces have a disadvantageous effect on the control behavior of the control valve.

In another embodiment, an assembly has a control valve according to the disclosure, wherein the second bore is connected permanently to an actuating cylinder of a hydraulic machine, wherein the actuating cylinder can be used to set a displacement volume of the hydraulic machine, wherein the first orifice is connected permanently to a pressure fluid source, wherein the second orifice is connected permanently to a pressure fluid sink. The hydraulic machine is preferably a hydraulic pump or a hydraulic motor, wherein both modes of operation may be possible in alternation. The hydraulic machine can be embodied as an axial piston machine of swash plate construction or bent-axis construction. The pressure fluid source can be a high pressure of the hydraulic machine or a pressure derived therefrom. A separate control oil pump can be provided as a pressure fluid source. The pressure fluid sink is preferably formed by a substantially unpressurized tank, from which the hydraulic machine draws in pressure fluid. The pressure fluid is preferably a liquid and most preferably hydraulic oil. The high pressure should be understood to mean the higher pressure at the two working ports of the hydraulic machine. In the case of a hydraulic machine with 4-quadrant capability, the high pressure can be supplied by means of a shuttle valve, which is connected to the two working ports mentioned. The actuating cylinder is preferably embodied as a single-acting cylinder.

Provision can be made for the control valve to be part of a control circuit, the manipulated variable of which is an opening cross section of the first and/or of the second orifice, wherein a control difference of the control circuit is formed by an equilibrium of forces at the control spool in the direction of the longitudinal axis. The control circuit can perform pressure control, wherein a high pressure of the hydraulic machine acts on the control spool in one direction, wherein a preloaded spring acts on the control spool in an opposite direction. The control circuit can perform delivery flow control.

It is self-evident that the features mentioned above and those which remain to be explained below can be used not only in the respectively indicated combination but also in other combinations or in isolation without exceeding the scope of the present disclosure.

BRIEF DESCRIPTION OF THE DRAWINGS

The disclosure is explained in greater detail below with reference to the appended drawings, in which.

DETAILED DESCRIPTION

Figure 1:
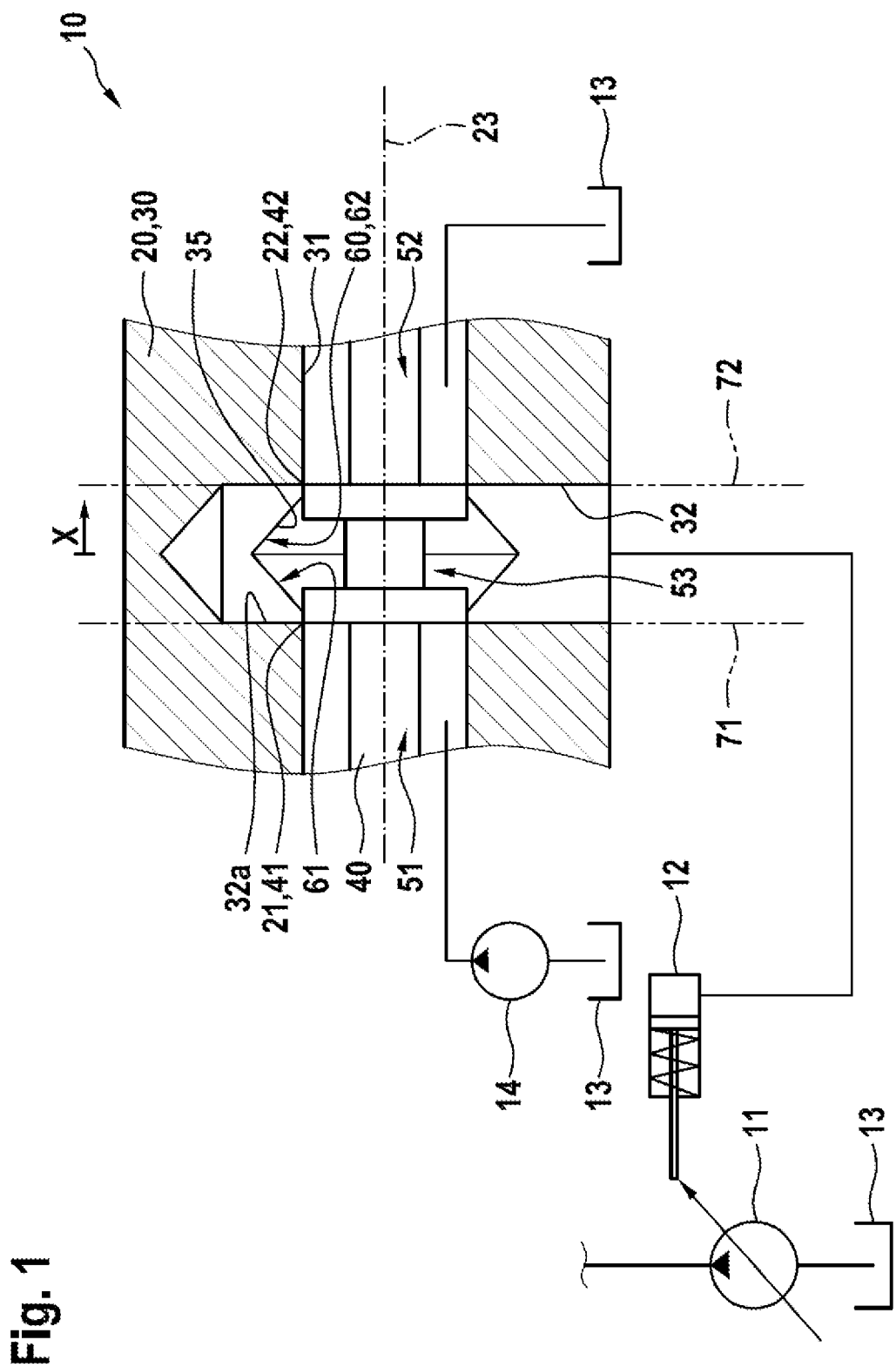
FIG. 1 shows a rough schematic sectional view of an assembly having a control valve according to a first embodiment.

FIG. 1 shows a rough schematic sectional view of an assembly 10 having a control valve 20 according to a first embodiment of the disclosure. The assembly 10 comprises a hydraulic machine 11, which is embodied as an axial piston machine of swash plate construction, for example. The hydraulic machine has a continuously adjustable displacement volume, which can be adjusted by means of an actuating cylinder 12. In the present case, the actuating cylinder 12 is designed as a single-acting cylinder. The actuating pressure supplied by the control valve 20 brings about a reduction in displacement volume, for example, wherein the internal hydraulic forces in the hydraulic machine 11 bring about an enlargement of the displacement volume. The hydraulic machine 11 draws in pressure fluid from a pressure fluid sink 13 in the form of a tank and delivers it to at least one hydraulic actuator (not illustrated). The pressure fluid is preferably a liquid and most preferably hydraulic oil. All the tank symbols in FIG. 1 refer to the same tank.

The control valve 20 has a housing 30, in which a control spool 40 is accommodated in a manner which allows linear movement along a longitudinal axis 23. For this purpose, the control spool 40 is accommodated in a first bore 31, which is circular-cylindrical with respect to the longitudinal axis 23 and which is matched in a fluid tight manner to the control spool 40. The control spool 40 can be formed by at least one of the two valve pistons of EP 1 409 873 B1, wherein it is preferably formed by the valve piston which is connected directly to the actuating cylinder. The entire contents of EP 1 409 873 B1 are referred to and incorporated into the contents of the present application.

The control spool 40 has a first, a second and a third neck portion 51; 52; 53, which each have a reduced diameter in comparison with the first bore 31, thus enabling pressure fluid to flow in the free space thus created. The optional third neck portion 53 is arranged between the first and the second neck portion 51; 52 in the direction of the longitudinal axis 23. The first neck portion 51 forms a first control edge 41 on the control spool 40, said edge extending around the longitudinal axis 23 in the form of a circular ring. In the position of the control spool 40 illustrated in FIG. 1, in which both the first and the second orifice 21; 22 are just closed, the first control edge 41 is arranged completely in the first reference plane 71, which is oriented perpendicularly to the longitudinal axis 23. It should be noted here that, for the sake of clarity, FIG. 1 shows a control valve 20 which has neither a positive nor a negative zero overlap, thus ensuring that the first and the second orifice 21; 22 are just closed in the same position of the control spool 40. However, the negative zero overlap used is one at which the first and the second orifice 21; 22 are simultaneously opened to a minimum extent in a small adjustment range of the control spool 40. The definition of the first and the second reference plane 71; 72 therefore describes two positions of the control spool 40 with a minimum difference. The stroke x of the control spool preferably has its zero point in the position shown in FIG. 1, or in the position in which the first and the second orifice 21; 22 are open to the same extent.

The second neck portion 52 defines a second control edge 42 on the control spool 40, which extends around the longitudinal axis 23 in the form of a circular ring. When the second orifice 22 is just closed, the second control edge 42 is arranged completely in the second reference plane. The optional third neck portion 53 and the effect thereof are explained further below with reference to FIG. 3.

The housing 30 has a second bore 32, which, in the present case, is oriented exactly perpendicularly to the longitudinal axis 23, wherein the centerlines of the first and the second bore 31; 32 intersect. In principle, it would be sufficient if the second bore 32 opened into the first bore 31, with the result that the corresponding intersection edge, together with the first and the second control edge 41; 42, formed the first and the second orifice 21; 22, respectively. In the present case, the second bore 32 traverses the first bore 31, thus forming a blind hole portion 32a. Accordingly, two of the intersection edges mentioned are present, wherein the two intersection edges interact with the first and the second control edge 41; 42, respectively, in order to form the first and the second orifice 21; 22, respectively. The diameter of the second bore 32 is preferably made smaller than the diameter of the first bore 31.

The first neck portion 51 is preferably connected to a pressure fluid source 14, which can be formed by a control oil pump, for example. The first orifice 21 thus influences the pressure fluid flowing toward the actuating cylinder 12. The second neck portion 52 is preferably connected to a pressure fluid sink 13, which is formed by the tank already discussed, for example. The second orifice 22 thus influences the pressure fluid flowing back from the actuating cylinder 12.

In the first embodiment of the disclosure, the radial recess 60 is formed by a groove 35 in the inner circumferential surface of the first bore 31, which groove extends around the longitudinal axis 23 in the form of a circular ring. The groove 35 is arranged completely between the first and the second reference plane 71; 72, wherein it is preferably at a short distance from both reference planes 71; 72. This implies that the groove 35 is interrupted in the circumferential direction by the two intersection edges discussed above. Accordingly, it has an effect on the opening behavior of the first and the second orifice 21; 22. The opening behavior should be understood to mean the relationship between the stroke x of the control spool 40 and the free cross-sectional area or flow resistance of the first and of the second orifice 21; 22.

The cross-sectional shape of the groove 35 is preferably of constant design over the entire circumference thereof. The cross-sectional shape has a first and a second sloping portion 61; 62, which are in each case embodied in a straight line, wherein, adjacent to the first and the second reference plane 71; 72, it merges with a sharp edge, in a rounded manner (cf FIG. 3) or with a chamfer into the first bore 31. In the first embodiment, the first and the second sloping portion 61; 62 have a relatively slight slope, with the result that, in the center of the groove 35, they form a common edge which extends around the longitudinal axis 23 in the form of a ring. If they have a steeper slope (cf FIG. 3), the groove can have a circular-cylindrical portion (No. 63 in FIG. 3) in the center.

The exact cross-sectional shape of the groove 35, in particular the slope of the first and of the second sloping portion 61; 62 and the free cross-sectional area of the groove 35, is preferably determined by experimentation or simulation, thus giving the desired control behavior of the control valve 20.

Figure 2:
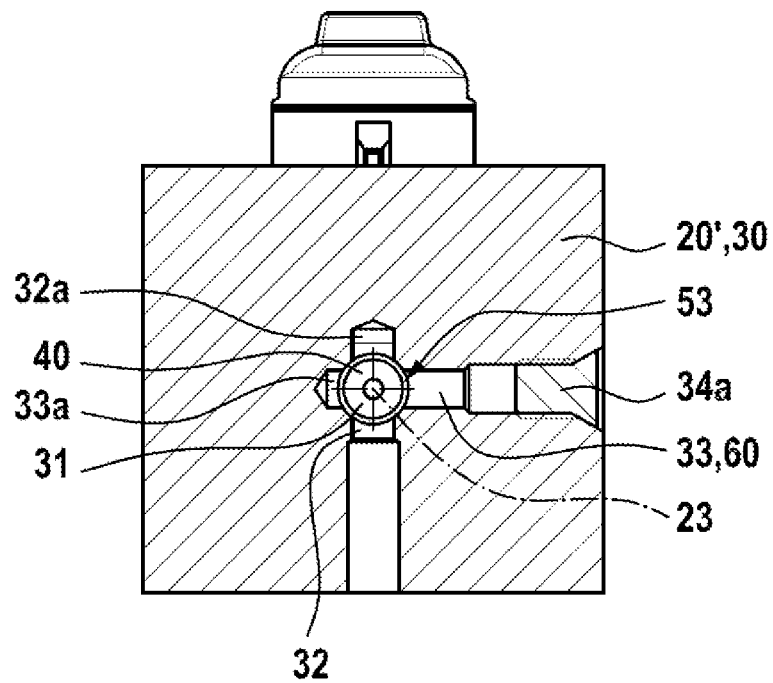
FIG. 2 shows a sectional view of a control valve according to a second embodiment.

FIG. 2 shows a sectional view of a control valve 20' according to a second embodiment of the disclosure. The second embodiment is identical to the first embodiment apart from the differences described below, and therefore attention is drawn in this regard to the statements relating to FIG. 1. In FIGS. 1 and 2, identical or corresponding parts are denoted by the same reference numerals.

In the second embodiment, the radial recess 60 is not formed by an encircling groove but by a third bore 33. The section plane in FIG. 2 is oriented perpendicularly to the longitudinal axis 23, wherein it contains the centerlines of the second and of the third bore 32, 33. The two centerlines are accordingly arranged in the same plane. They are preferably arranged offset by 90° relative to one another with respect to the longitudinal axis 23. The third bore 33 traverses the first bore 31, more specifically in a manner similar to the second bore 32. The third bore 33 is embodied in the manner of a blind hole, wherein it forms a blind hole portion 33a that protrudes beyond the first bore 31. The diameter of the third bore 33 is made smaller than the diameter of the first bore 31, more particularly in the region in which the first and the third bore 31; 33 intersect. The third bore 33 is sealed tightly with respect to the outside by means of a plug 34, wherein the plug 34 is designed as a countersunk head screw, for example.

Like the second bore 32, the third bore 33 forms two intersection edges with the first bore 31. These intersection edges likewise interact with the first and the second control edge (No. 41; 42 in FIG. 1) on the control spool 40, with the result that they influence the opening behavior of the first and the second orifice, more specifically in such a way that the opening cross section thereof is enlarged as compared with a state without the third bore 33, more specifically in each position of the control spool 40.

The second embodiment can be combined with the first or the third embodiment.

Figure 3:
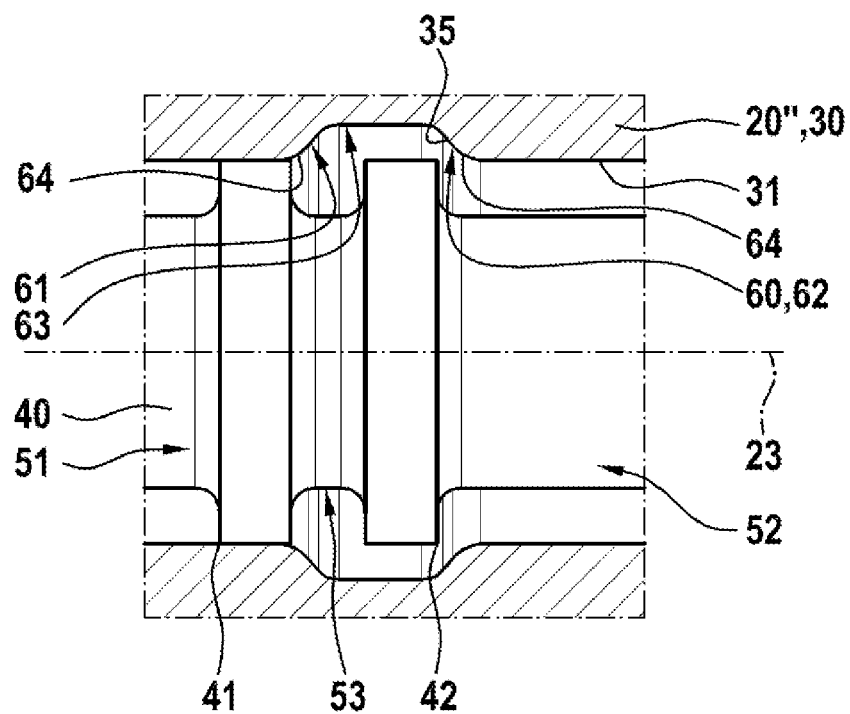
FIG. 3 shows a sectional view of a control valve according to a third embodiment.

FIG. 3 shows a sectional view of a control valve 20" according to a third embodiment of the disclosure. The third embodiment is embodied in a manner identical to the first embodiment apart from the differences described below, and therefore attention is drawn in this regard to the statements relating to FIG. 1. In FIGS. 1 and 3, identical or corresponding parts are denoted by the same reference numerals.

First of all, the slope of the first and of the second sloping portion 61; 62 relative to the longitudinal axis 23 is made greater than in the first embodiment. The two slopes mentioned are preferably the same in terms of absolute value. To ensure that the volume of the recess 60 does not become excessively large, a circular-cylindrical portion 63 is provided between the first and the second sloping portion 61; 62.

The increased slope of the first and of the second sloping portion 61; 62 has the effect, in particular, that some of the pressure fluid flowing through the first and the second orifice is deflected into the third neck portion 53. There, the pressure fluid gives rise to a force acting in the direction of the longitudinal axis 23 on the control spool 40. The slope mentioned is preferably configured in such a way that all the flow forces that act on the control spool 40 in the direction of the longitudinal axis 23 cancel each other out as far as possible. To achieve this, said slope and the depth and width of the third neck portion can be varied.

In the third embodiment, the transition from the first bore 31 to the first and the second sloping portion 61; 62 is furthermore embodied in a rounded manner 64. It is self-evident that this measure can also be applied per se to the first embodiment.

REFERENCE SIGNS x stroke of the control spool
10 assembly
11 hydraulic machine
12 actuating cylinder
13 pressure fluid sink
14 pressure fluid source
20 control valve (first embodiment)
20' control valve (second embodiment)
20" control valve (third embodiment)
21 first orifice
22 second orifice
23 longitudinal axis
30 housing
31 first bore
32 second bore
32a blind hole portion of the second bore
33 third bore
33a blind hole portion of the third bore
34 plug (on the third bore)
35 groove
40 control spool
41 first control edge
42 second control edge
51 first neck portion
52 second portion
53 third neck portion
60 radial recess
61 first sloping portion
62 second sloping portion
63 circular-cylindrical portion
64 rounding
71 first reference plane
72 second reference plane

The invention claimed is:

1. A control valve comprising:
a housing defining a first bore and a second bore; and
a control spool accommodated in the first bore in such a way as to be movable along a longitudinal axis, the control spool having a first neck portion and a second neck portion, each of which has a reduced diameter in comparison with the first bore, the control spool resting in a sealing manner against the first bore between the first and the second neck portions and defining a first control edge and a second control edge, which are spaced apart from one another in a direction along the longitudinal axis and which each extend in the form of a ring around the longitudinal axis,
wherein the second bore, which opens transversely to the longitudinal axis into the first bore such that, together with the first and second control edges, the second bore defines a first orifice and a second orifice, which can be adjusted by moving the control spool,
wherein a first reference plane and a second reference plane are each oriented perpendicularly to the longitudinal axis, the first reference plane defined by the first control edge when the first orifice is just closed by the first control edge, and the second reference plane defined by the second control edge when the second orifice is just closed by the second control edge,
wherein at least one radial recess different from the second bore is provided in the first bore between the first and second reference planes in the direction of the longitudinal axis, and
wherein a maximum axial extent of the at least one radial recess along the longitudinal axis, measured from a third plane perpendicular to the longitudinal axis and including an axis defined by the second bore is less than a maximum axial extent of the second bore as measured from the third plane to an intersection of the first and second bores.

2. The control valve according to claim 1, wherein:
the at least one radial recess is configured to protrude beyond a circular cylinder defined by the first and second control edges and define a volume outwardly of the circular cylinder;
said volume causes a reduction in flow resistance to a fluid through the control valve by way of the first and second orifices at each control spool position which permits flow through at least one of the first and second orifices; and
at each of the control spool positions which permits flow through at least one of the first and second orifices, the reduction in flow resistance does not exceed 50% of a corresponding flow resistance of the fluid through a third and fourth orifice of an otherwise identical control valve, which does not include the radial recess, at each of the corresponding positions of a control spool in the otherwise identical control valve which permits flow through at least one of the third and fourth orifices.

3. The control valve according to claim 1, wherein the at least one radial recess is formed by a third bore defined in the housing that extends transversely to the longitudinal axis and transversely to an axis defined by the second bore, a diameter of the third bore smaller than a diameter of the second bore.

4. The control valve according to claim 1, wherein the at least one radial recess is formed by at least one groove defined in the housing, the at least one groove extending as a portion of a circular ring with a constant cross-sectional shape around the longitudinal axis.

5. The control valve according to claim 4, wherein the constant cross-sectional shape has a first sloping portion and a second sloping portion, which slope in opposite directions relative to the longitudinal axis, and the first and second sloping portions are arranged adjacent to one another in a region of maximum depth of the groove.

6. The control valve according to claim 5, wherein at least one of the first sloping portion and the second sloping portion is straight.

7. The control valve according to claim 6, wherein a slope of the at least one of the first sloping portion and the second sloping portion relative to the longitudinal axis is between 5° and 45°.

8. The control valve according to claim 5, wherein a transition between the first and/or second sloping portion and the first bore is rounded or beveled.

9. The control valve according to claim 1, wherein the control spool has a third neck portion, which has a reduced diameter in comparison with the first bore, the third neck portion arranged between the first and second control edges.

10. The assembly according to claim 1, wherein:
the spool is at a first location within the bore when the first orifice is just closed; and
the spool is at the first location within the bore when the second orifice is just closed.

11. An assembly comprising:
a control valve comprising:
a housing defining a first bore and a second bore; and
a control spool accommodated in the first bore in such a way as to be movable along a longitudinal axis, the control spool having a first neck portion and a second neck portion, each of which has a reduced diameter in comparison with the first bore, the control spool resting in a sealing manner against the first bore between the first and the second neck portions and defining a first control edge and a second control edge, which are spaced apart from one another in a direction along the longitudinal axis and which each extend in the form of a ring around the longitudinal axis, wherein:

the second bore, opens transversely to the longitudinal axis into the first bore such that, together with the first and second control edges, the second bore defines a first orifice and a second orifice, which can be adjusted by moving the control spool, a first reference plane and a second reference plane are each oriented perpendicularly to the longitudinal axis, the first reference plane defined by the first control edge when the first orifice is just closed by the first control edge, and the second reference plane defined by the second control edge when the second orifice is just closed by the second control edge, at least one radial recess different from the second bore is provided in the first bore between the first and second reference planes in the direction of the longitudinal axis, a maximum axial extent of the at least one radial recess along the longitudinal axis, measured from a third plane perpendicular to the longitudinal axis and including an axis defined by the second bore is less than a maximum axial extent of the second bore as measured from the third plane to an intersection of the first and second bores, the second bore is connected permanently to an actuating cylinder of a hydraulic machine, the actuating cylinder configured to set a displacement volume of the hydraulic machine, the first orifice is connected permanently to a pressure fluid source, and the second orifice is connected permanently to a pressure fluid sink.

12. The assembly according to claim 11, wherein:

the control valve is part of a control circuit that has a manipulated variable corresponding to an opening cross section of the first or of the second orifice, and a control difference of the control circuit is formed by an equilibrium of forces at the control spool in the direction of the longitudinal axis.

13. The assembly according to claim 11, wherein:

the spool is at a first location within the bore when the first orifice is just closed; and the spool is at the first location within the bore when the second orifice is just closed.

14. The assembly according to claim 11, wherein:

the spool is at a first location within the bore when the first orifice is just closed; and the spool is not at the first location within the bore when the second orifice is just closed.

15. The assembly according to claim 12, wherein:

the spool is at a first location within the bore when the first orifice is just closed; and the spool is not at the first location within the bore when the second orifice is just closed.

* * * * *